United States Patent [19]

Iino

[11] Patent Number: 4,776,165

[45] Date of Patent: Oct. 11, 1988

[54] CLUTCH CONTROL SYSTEM FOR HYDRAULICALLY OPERATED AUTOMOTIVE TRANSMISSION

[75] Inventor: Takashi Iino, Wako, Japan

[73] Assignee: Honda Giken Kogyo Kabushiki Kaisha, Tokyo, Japan

[21] Appl. No.: 937,790

[22] Filed: Dec. 4, 1986

[30] Foreign Application Priority Data

Dec. 5, 1985 [JP] Japan ............... 60-274214

[51] Int. Cl.⁴ .................................. F16D 31/00
[52] U.S. Cl. ........................... 60/431; 60/468
[58] Field of Search .................... 60/431, 468

[56] References Cited

FOREIGN PATENT DOCUMENTS 95722 8/1981 Japan ............................ 60/468

Primary Examiner—Gerald A. Michalsky
Attorney, Agent, or Firm—Armstrong, Nikaido, Marmelstein & Kubovcik

[57] ABSTRACT

A hydraulically operated automotive transmission on an automobile includes a hydraulic pump coupled to an engine-operated input shaft, a hydraulic motor coupled to a wheel-driving output shaft, a closed hydraulic circuit connected between the hydraulic pump and the hydraulic motor, and a bypass passage connected between the inlet and outlet ports of the hydraulic pump in bypassing relation to the hydraulic motor. A clutch control system combined with the transmission comprises a clutch valve disposed in the bypass passage for selectively opening and closing the bypass passage, and an automatic control device coupled to the clutch valve for controlling the operation of the clutch valve. The automatic control device opens the clutch valve to a first extent which prevents the automobile from creeping while the engine is idling, and closes the clutch valve to a second extent which prevents the engine from racing when the automobile is started.

12 Claims, 3 Drawing Sheets

CLUTCH CONTROL SYSTEM FOR HYDRAULICALLY OPERATED AUTOMOTIVE TRANSMISSION

BACKGROUND OF THE INVENTION

The present invention relates to a clutch control system for use with a hydraulically operated automotive transmission which includes a closed hydraulic circuit connected between a hydraulic pump coupled to an engine-operated input shaft and a hydraulic motor coupled to a wheel-driving output shaft, and a bypass passage connected between the inlet and outlet ports of the hydraulic pump in bypassing relation to the hydraulic motor, the clutch control system having a clutch valve disposed in the bypass passage for selectively opening and closing the bypass passage and an automatic control device coupled to the clutch valve for controlling the operation of the clutch valve.

One known clutch control system of the type described above is disclosed in Japanese Laid-Open Patent Publication No. 56-95722 published on Aug. 3, 1981.

While an automotive engine combined with the conventional clutch system is idling, the clutch valve of the clutch control system is slightly closed, i.e., the clutch system is partly engaged, to impose an appropriate initial load on the engine in order to prevent the engine from racing at the time of subsequently starting the automobile. With the clutch system being thus partly engaged during idling of the engine, however, the automobile tends to move slowly in a forward direction, a phenomenon widely known as so-called "creeping". When the creeping occurs, the engine is subjected to a load tending to reduce the rotational speed of the engine. Therefore, it is necessary to increase the opening of the throttle valve during engine idling to a degree which makes up for the reduction in the rotational speed of the engine. However, this results in increased fuel consumption. Furthermore, if the automobile is braked by the driver while the engine is idling, engine vibration is transmitted to the automobile body to impair riding comfort.

SUMMARY OF THE INVENTION

In view of the aforesaid drawbacks of the conventional clutch control system, it is an object of the present invention to provide a clutch control system for use on an automobile with a hydraulically operated automotive transmission, the clutch control system being capable of preventing the automobile from creeping while the engine is idling.

According to the present invention, there is provided a clutch control system in a hydraulically operated automotive transmission on an automobile having an engine, the transmission including a hydraulic pump coupled to an engine-operated input shaft, a hydraulic motor coupled to a wheel-driving output shaft, a closed hydraulic circuit connected between the hydraulic pump and the hydraulic motor, and a bypass passage connected between the inlet and outlet ports of the hydraulic pump in bypassing relation to the hydraulic motor. The clutch control system comprises a clutch valve disposed in the bypass passage for selectively opening and closing the bypass passage, and an automatic control device coupled to the clutch valve for controlling the operation of the clutch valve. The automatic control device opens the clutch valve to a first extent which prevents the automobile from creeping while the engine is idling, and closes the clutch valve to a second extent which prevents the engine from racing when the automobile is started.

Therefore, while the engine is idling, the automobile is prevented from creeping, for thereby improving fuel economy and riding comfort. Furthermore, when starting the automobile, the engine is prevented from racing.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
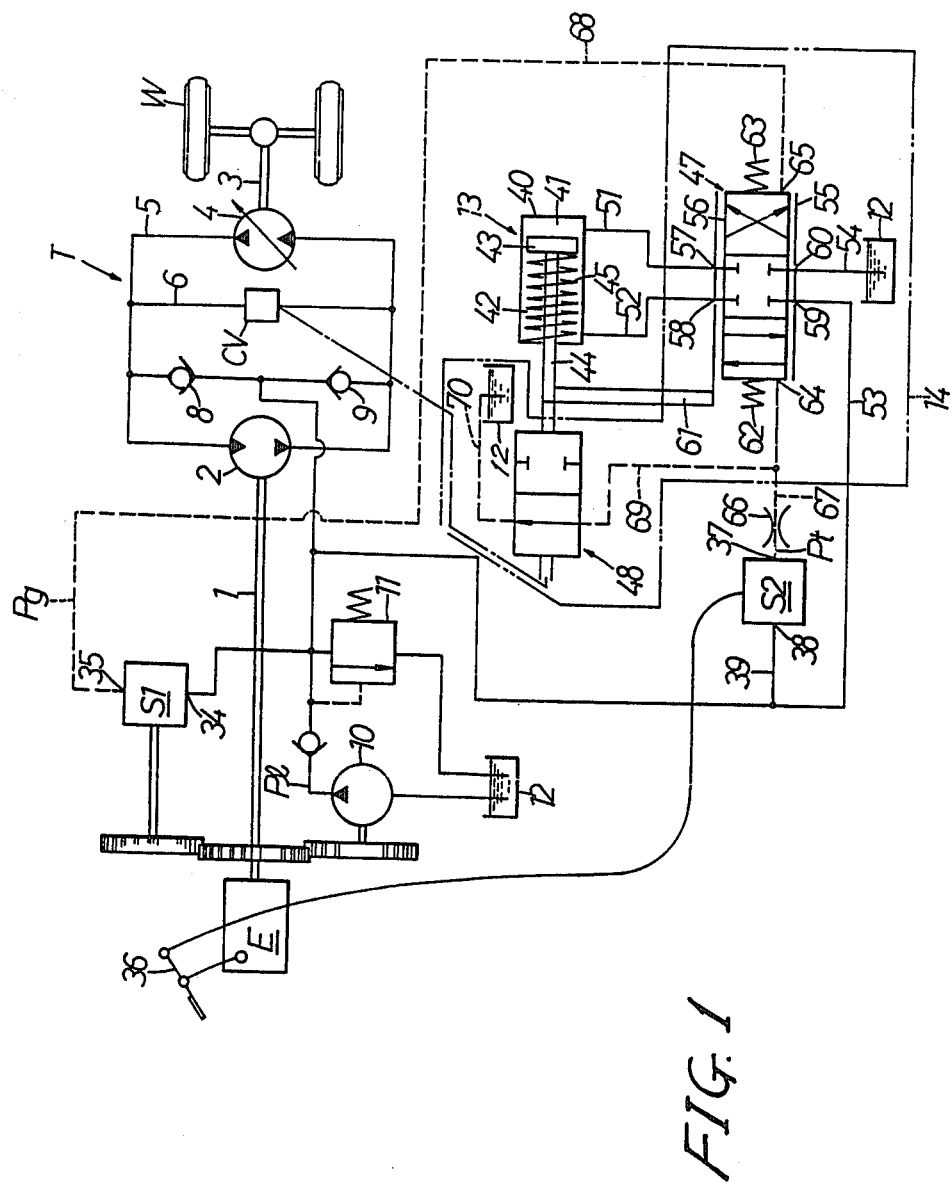
FIG. 1 is a schematic diagram of a hydraulic control circuit arrangement of a clutch control system according to a first embodiment of the present invention.

Like or corresponding reference numerals and letters denote like or corresponding parts throughout the views.

As shown in FIG. 1, a clutch control system according to a first embodiment of the present invention is associated with a hydraulically operated, continuously variable automotive transmission T. The transmission T includes a hydraulic pump 2 of the fixed displacement type having an input shaft 1 drivable by an automotive engine E, and a hydraulic motor 4 of the variable displacement type having an output shaft 3 for driving wheels W and disposed coaxially with the hydraulic pump 2. The hydraulic pump 2 and the hydraulic motor 4 are interconnected by a closed hydraulic circuit 5 to which there is connected a bypass passage 6 with a clutch valve CV disposed therein. The bypass passage 6 is coupled between the inlet and outlet ports of the hydraulic pump 2 in bypassing relation to the hydraulic motor 4. A supply pump 10 which can be driven by the input shaft 1 through a gear train has an outlet port connected via check valves 8, 9 to the closed hydraulic circuit 5 for supplying working oil from an oil tank 12 to the closed hydraulic circuit 5 in order to compensate for a shortage of oil in the circuit 5. A relief valve 11 is connected between the outlet port of the supply pump 10 and the oil tank 12 for releasing an excessive oil pressure discharged by the supply pump 10.

The clutch valve CV is operated by an actuator 13 which is controlled by an automatic control device 14. To the automatic control device 14, there are connected a first detector S1 for detecting the rotational speed of the engine and a second detector S2 for detecting the opening of the throttle valve of the engine E. The automatic control device 14 controls the operation of the clutch valve CV based on input signals delivered from the first and second detectors S1, S2.

The first detector S1 comprises a hydraulic governor, for example, operable in response to the rotation of the input shaft 1. More specifically, the first detector S1 is operatively coupled to the engine E through a gear train. The first detector S1 has an inlet port 34 connected to the outlet port of the supply pump 10 and an outlet port 35 for producing a hydraulic governor pressure Pg proportional to the rotation of the engine E.

The second detector S2 comprises a converter for converting a throttle valve opening to a hydraulic pressure, for example, and has an outlet port 37 for producing a hydraulic throttle pressure Pt commensurate with the operation of a device 36 for opening and closing the throttle valve. The second detector S2 also has an outlet port 38 coupled via an oil passage 39 to the outlet port of the supply pump 10.

The actuator 13 comprises a servo cylinder assembly, for example, including a cylinder 40, a piston 43 slidably fitted in the cylinder 40 and dividing the interior of the cylinder 40 into a head chamber 41 and a rod chamber 42, a piston rod 44 integrally joined to the piston 43 and extending movably in a fluid-tight manner through the end of the cylinder 40 adjacent to the rod chamber 42, and a spring 45 housed in the rod chamber 42 for normally urging the piston 43 to move in a direction into the head chamber 41. The clutch valve CV is closed when the piston 43 and hence the piston rod 44 are moved to the left (FIG. 1).

The automatic control device 14 generally comprises a pilot-operated valve 47 and a mechanically operated on-off or shut-off valve 48. The pilot-operated valve 47 is in the form of a four-port throttling valve connected between oil passages 51, 52 communicating respectively with the head and rod chambers 41, 42 of the actuator 13 and an oil supply passage 53 connected to the outlet port of the supply pump 10 and an oil release passage 54 communicating with the oil tank 12. The pilot-operated valve 47 comprises a sleeve 55 and a spool 56 movably disposed in the sleeve 55.

The pilot-operated valve 47 has ports 57, 58 communicating with the oil passages 51, 52, respectively, and ports 59, 60 communicating with the oil supply and release passages 53, 54, respectively. The sleeve 55 is connected by a link 61 to the piston rod 44 of the actuator 13. Consequently, movement of the actuator 13 can be fed back to the pilot-operated valve 47.

The spool 56 is switchingly movable relatively to the sleeve 55 between a lefthand position the spool moved to the right in FIG. 1 in which the ports 58, 59 communicate with each other and the ports 57, 60 communicate with each other, a neutral position in which the ports 57, 58 and the ports 59, 60 are disconnected from each other, and a righthand position the spool moved to the left in FIG. 1 in which the ports 57, 59 communicate with each other and the ports 58, 60 communicate with each other. A spring 62 for normally urging the spool 56 to the right is held against the lefthand end of the spool 56, and another spring 63 for normally urging the spool 56 to the left is held against the righthand end of the spool 56. The pilot-operated valve 47 has a switching port 64 for imposing hydraulic pressure on the lefthand end of the spool 56 and another switching port 65 for imposing hydraulic pressure on the righthand end of the spool 56.

The switching port 64 is coupled to the outlet port 37 of the second detector S2 via a pilot oil passage 67 having a restriction 66. The other switching port 65 is coupled to the outlet port 35 of the first detector S1 via a pilot oil passge 68.

The force F1 acting on the lefthand end of the spool 56 is the sum of the spring load F11 exerted by the spring 62 and the hydraulic pressure F12 applied to the lefthand end of the spool 56 through the switching port 64 (F1=F11+F12). Likewise, the force F2 acting on the righthand end of the spool 56 is the sum of the spring load F21 exerted by the spring 63 and the hydraulic pressure F22 applied to the righthand end of the spool 56 through the switching port 65 (F2=F21+F22). The spool 56 is therefore moved with respect to the sleeve 55 when the forces F1, F2 are brought out of equilibrium.

For example, when the force F1 becomes smaller than the force F2 (F1<F2), the spool 56 is moved leftwardly into the righthand position with respect to the sleeve 55. Therefore, the hydraulic pressure P1 discharged from the supply pump 10 is introduced via the pilot-operated valve 47 into the head chamber 41 of the actuator 13, and the hydraulic pressure in the rod chamber 42 is released into the oil tank 12. The piston 43 and the piston rod 44 are now moved to the left to operate the clutch valve CV in a closing direction.

As the spool 56 is moved to the left, the spring load F11 of the spring 62 is increased and the spring load F21 of the spring 63 is reduced until the forces F1, F2 are blanced (F1=F2), whereupon the leftward movement of the spool 56 is stopped. The sleeve 55 is also moved to the left in response to the leftward movement of the piston rod 44. Therefore, when the sleeve 55 and the spool 56 are relatively positioned in the neutral position, the oil flows between the ports 57, 59 and 58, 60 are cut off, stopping the leftward movement of the piston rod 44. As a result, the operation of the clutch valve CV is also stopped. The movement of the sleeve 55 is also brought to a stop in timed relation to the piston rod 44.

When F1>F2, the spool 56 is moved to the right into the lefthand position with respect to the sleeve 55. The hydraulic pressure P1 from the supply pump 10 is introduced via the pilot-operated valve 47 into the rod chamber 42 of the actuator 13, moving the piston 43 and the piston rod 44 to the right. The clutch valve CV is now operated in an opening direction.

Upon the rightward movement of the spool 56, the spring load F21 of the spring 63 is increased and the spring load F11 of the spring 62 is reduced until the forces F1, F2 are balanced (F1=F2), whereupon the rightward movement of the spool 56 is stopped. The sleeve 55 is also moved to the right in response to the rightward movement of the piston rod 44. When the sleeve 55 and the spool 56 are relatively positioned in the neutral position, the oil supply into the rod chamber 42 is cut off, stopping the rightward movement of the piston rod 44 and also the operation of the clutch valve CV. The movement of the sleeve 55 is also stopped with the piston rod 44.

The actuator 13 and the pilot-operated valve 47 consitute a general servomechanism for adjusting the opening of the clutch valve CV and hence the opening of the bypass passage 6 through movement of the piston 43 in response to movement of the spool 56.

While the engine E is idling, the lefthand end of the spool 56 of the pilot-operated valve 47 is subjected to the hydraulic throttle pressure Pt which is reduced to almost zero by the on-off valve 48 as described later on, and the righthand end of the spool 56 is subjected to the hydraulic governor pressure Pg corresponding to the rotational speed of the engine E. As a consequence, F1≈F11 and F2=F21+F22. According to the present invention, the spring load imposed by the spring 62 is selected such that F1≧F2.

Figure 2A:
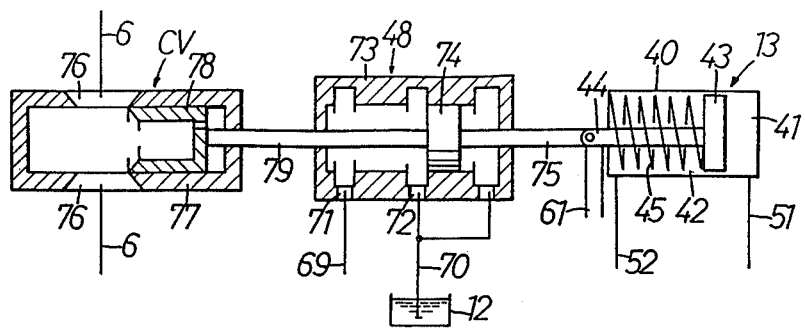
FIGS. 2(a), 2(b) and 2(c) are cross-sectional views showing the manner in which an actuator, an on-off valve, and a clutch valve are operated in mutually interlinked relation.
Figure 2B:
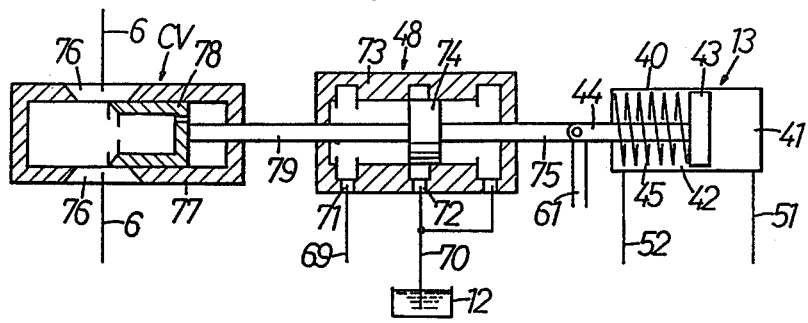
Figure 2C:
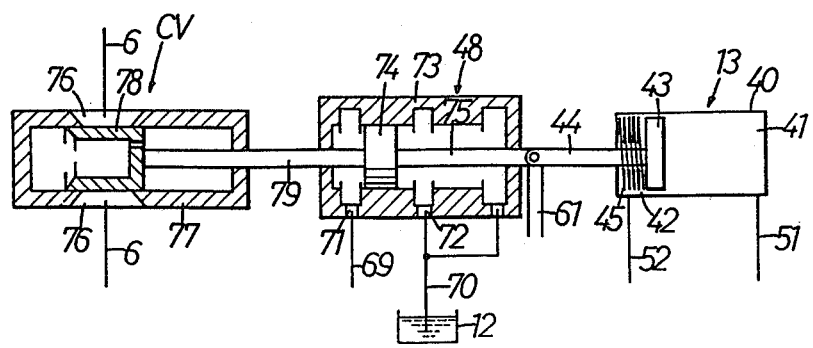

As illustrated in FIGS. 2(a) through 2(c), the on-off valve 48 is disposed between a branch oil passage 69 branched from the pilot oil passage 67 downstream of the restriction 66 and an oil release passage 70 communicating with the oil tank 12. The on-off valve 48 is actuatable in response to operation of the clutch valve CV and hence the actuator 13.

The on-off valve 48 comprises a cylinder 73 having a port 71 communicating with the branch oil passage 69 and a port 72 communicating with the oil release passage 70 and a spool 74 slidably fitted in the cylinder 73. The spool 74 is movable between a position in which the ports 71, 72 communicate with each other and a position in which the ports 71, 72 are disconnected from each other. The spool 74 is integrally joined to an actuator rod 75 movably extending through one of the end walls of the cylinder 73 in a fluid-tight manner and coupled coaxially to the piston rod 44 of the actuator 13.

When the actuator 13 is operated to close the clutch valve CV, the piston rod 44 and hence the actuator rod 75 are moved to the left, and so is the spool 74 to disconnect the ports 71, 72 from each other, as shown in FIG. 2(c). When the actuator 13 is operated to open the clutch valve CV, the spool 74 is moved to the right to allow the ports 71, 72 to communicate with each other, as shown in FIG. 2(a).

The restriction 66 of the pilot oil passage 67 serves to limit the release of the hydraulic throttle pressure Pt from the second detector S2 when the on-off valve 48 is in a lefthand position, i.e., a position to allow the branch oil passage 69 and the oil release passage 70 to communicate with each other, thus releasing the hydraulic pressure from the switching port 64 of the pilot-operated valve 47. Therefore, the restriction 66 should be of such a size that enables the above limitation and does not largely affect the response of the hydraulic throttle pressure Pt to the switching port 64.

The clutch valve CV comprises a fixed cylinder 77 having closed opposite end walls and a pair of bypass holes 76 defined in diametrically opposite relation and communicating with the bypass passage 6, and a bottomed cylindrical valve body 78 slidably disposed in the fixed cylinder 77. A connecting rod 79 having one end coaxially fixed to the spool 74 of the on-off valve 48 extends movably through the other end wall of the cylinder 73 and one of the end walls of the fixed cylinder 77 in a fluid-tight manner. The other end of the connecting rod 79 is coaxially fixed to the valve body 78. Accordingly, when the piston 43 and the piston rod 44 of the actuator 13 are moved to the left, the on-off valve 48 is operated to disconnect the ports 71, 72 from each other, and the clutch valve CV is operated in a closing direction. Conversely, when the piston 43 and the piston rod 44 of the actuator 13 are moved to the right, the on-off valve 48 is operated to connect the ports 71, 72 to each other, and the clutch valve CV is operated in an opening direction.

The clutch valve CV may be of any of various constructions. Valve constructions which may be employed as the clutch valve CV can roughly be classified into two types: the illustrated restriction valve type and the directional control valve type having an intermediate position in which the degree of restriction is continuously variable. The restriction valve type can further be grouped into the type in which the valve body is linearly movable as shown in FIGS. 2(a) through 2(c) and the type in which the valve body is angularly movable.

Operation of the clutch control system shown in FIGS. 1 and 2(a) through 2(c) is as follows: Before the engine E is started, the supply pump 10 remains stopped and the discharged hydraulic pressure P1 is zero. Therefore, the hydraulic governor pressure Pg and the hydraulic throttle pressure Pt are also zero. The position of the spool 56 of the pilot-operated valve 47 is determined by the set loads of the springs 62, 63, and the set loads of the springs 62, 63 are selected such that the spool 56 is displaced to the right into the lefthand position for opening the clutch valve CV. The piston 43 and the piston rod 44 of the actuator 13 are biased by the spring 45 to move to the right, thereby opening the clutch valve CV and the on-off valve 48. The sleeve 55 of the pilot-operated valve 47 is also displaced to the right by the link 61.

When the engine E is started and kept in an idling condition, the supply pump 10 is operated to discharge a constant hydraulic pressure P1. The first detector S1 produces a hydraulic governor pressure Pg commensurate with the idling speed of the engine E. The second detector S2 produces a hydraulic throttle pressure Pt commensurate with the opening of the throttle valve which corresponds to the idling operation of the engine E. Since, however, the on-off valve 48 is open to connect the branch oil passage 69 to the oil release passage 70, the hydraulic pressure acting on the switching port 64 of the pilot-operated valve 47 is almost nil.

At this time, the load imposed by the spring 62 is relatively large to achieve the relationship: $(F1=F11) \geq (F2=F21+F22)$. Therefore, the spool 56 is in the lefthand or neutral position, and the clutch valve CV remains in the fully open position as shown in FIG. 2(a). Accordingly, insofar as the engine E is idling, the clutch valve CV is in the fully open position. Oil discharged from the hydraulic pump 2 flows in its entirety through the bypass passage 6 and the clutch valve CV and returns to the hydraulic pump 2 without being supplied to the hydraulic motor 4. The automobile is thus prevented from creeping during engine idling.

By depressing the accelerator pedal to start moving the automobile, the throttle valve is opened. However, the hydraulic throttle valve Pt remains at substantially zero because the on-off valve 48 is in the open position as illustrated in FIG. 2(a). As the rotational speed of the engine E increases, the hydraulic governor pressure Pg is raised to increase the force F2 so that the spool 56 of the pilot-operated valve 47 is moved to the left under the condition $F1<F2$. The hydraulic pressure P1 discharged by the supply pump 10 is now introduced into the head chamber 41 of the actuator 13, moving the piston 43 and the piston rod 44 to the left against the resiliency of the spring 45. The instant the ports 71, 72 are disconnected from each other as shown in FIG. 2(b), the hydraulic throttle pressure Pt corresponding to the throttle valve opening is applied from the second detector S2 to the lefthand end of the spool 56 through the switching port 64. The hydraulic throttle pressure Pt is determined such that $F1 \geq F2$ on the pilot-operated valve 47 at this time. If $F1=F2$, then the spool 56 is stopped at the moment the ports 71, 72 are disconnected. If $F1>F2$, then the spool 56 is moved back to the right and so is the piston rod 44, bringing the ports 71, 72 into mutual communication, so that the condition $F1<F2$ is reached again. The spool 74 of the on-off valve 48 is therefore stopped in a boundary zone between the position in which the ports 71, 72 communicate with each other and the position in which the ports 71, 72 are disconnected from each other, and the spool 56, the piston 43, and the piston rod 44 are stopped in their corresponding positions.

At this time, the clutch valve CV is positioned to restrict the bypass holes 76 slightly as shown in FIG. 2(b). The oil discharged from the hydraulic pump 2 and flowing through the clutch valve CV is slightly limited to impose an appropriate initial load on the engine E, which is then prevented from racing at the time of starting the automobile.

As the rotational speed of the engine E goes higher, the hydraulic governor pressure Pg is also increased to increase the force F2 tending to move the spool 56 to the left. When the force F2 is increased to the extent which overcomes the force F1, the spool 56 is moved to the left to displace the pilot-operated valve 47 to the righthand position. The hydraulic pressure P1 from the supply pump 10 is now supplied via the pilot-operated valve 47 to the head chamber 41 of the actuator 13. The piston 43 and the piston rod 44 are caused to move to the left against the resiliency of the spring 45, thereby moving the valve body 78 of the clutch valve CV to the left. The open cross-sectional area of the bypass holes 76 is gradually reduced by the valve body 78 for thereby allowing the oil from the hydraulic pump 2 to be supplied to the hydraulic motor 4. As the oil flow from the hydraulic pump 2 to the hydraulic motor 4 is increased to the extent which starts driving the hydraulic motor 4, the automobile starts moving. The speed-reduction ratio between the shafts 1, 3 can now be changed continuously in a stepless fashion by varying the displacement of the hydraulic motor 4 while the hydraulic motor 4 is being driven by the hydraulic pump 2.

The spool 56 of the pilot-operated valve 47 is moved further to the left as the force F2 becomes larger than the force F1 until the spool 56 reaches the leftmost position. At this time, the clutch valve CV is in the position of FIG. 2(c) in which the bypass holes 76 are fully closed by the valve body 78, and the ports 71, 72 of the on-off valve 48 are disconnected from each other.

As described above, when the rotational speed of the engine starts being increased with the opening of the throttle valve, the clutch valve CV is positioned to restrict the bypass holes 76 slightly as shown in FIG. 2(b), irrespective of the throttle valve opening. The engine E is now prevented from racing inasmuch as an appropriate initial load is imposed on the engine E.

When the clutch valve CV is in the position of FIG. 2(b), e.g., when the throttle valve opening is large, the rotational speed of the engine E is continuously increased until $F1 < F2$, whereupon the clutch valve CV is operated in the closing direction. When the throttle valve opening is small, the rotational speed of the engine E is continuously increased slightly before $F1 < F2$, and the clutch valve CV is operated in the closing direction when the condition $F1 < F2$ is reached. Thus, the clutch valve CV can be operated at the engine speed dependent on the throttle valve opening.

For stopping the automobile, the driver's foot is released from the accelerator pedal to close the throttle valve. The hydraulic throttle pressure Pt is lowered accordingly, and the hydraulic governor pressure Pg is lowered as the rotational speed of the engine E is reduced. When $F1 > F2$, the spool 56 is moved to the right. Upon the rightward movement of the spool 56, the hydraulic pressure P1 from the supply pump 10 is introduced into the rod chamber 42 of the actuator 13 to displace the piston 43 and the piston rod 44. The valve body 78 of the clutch valve CV is also moved to the right, increasing the open cross-sectional area of the bypass passages 76. The oil flow between the hydraulic pump 2 and the hydraulic motor 4 is gradually reduced. When communication between the ports 71, 72 of the on-off valve 48 is resumed, the hydraulic throttle valve Pt is reduced to substantially zero. If $F1 > F2$, then the spool 56 of the pilot-operated valve 47 is moved further to the right. As the rotational speed of the engine E is lowered further, the spool 56 is displaced further to the right. When the engine speed reaches the idling speed, the clutch valve CV is fully opened, and no oil flows from the hydraulic pump 2 to the hydraulic motor 4. The automobile is now brought to a stop.

Figure 3:
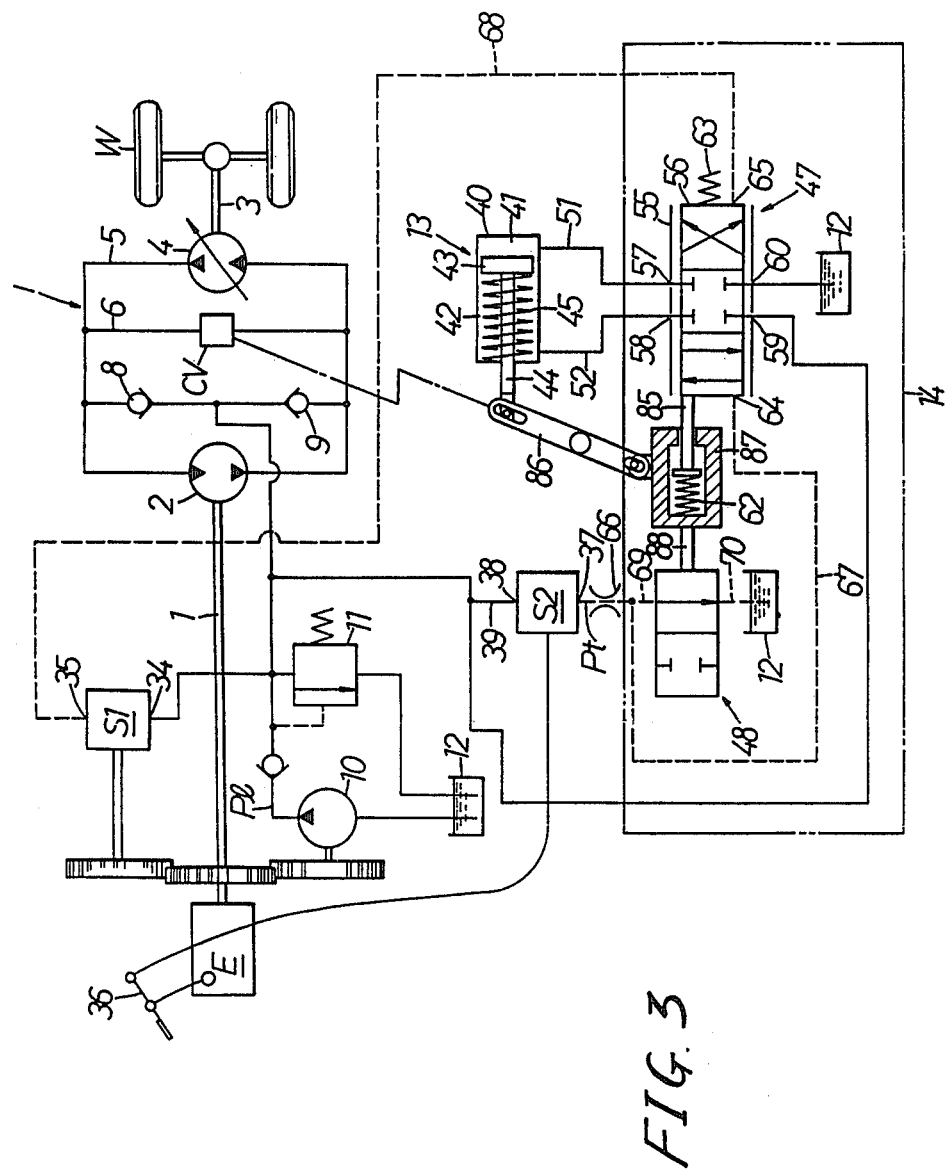
FIG. 3 is a schematic diagram of a hydraulic control circuit arrangement of a clutch control system according to a second embodiment of the present invention.

FIG. 3 shows a clutch control system according to a second embodiment of the present invention. The clutch control system of FIG. 3 shares certain components with the clutch control system according to the first embodiment, and those common components will not be described in detail. The on-off valve 48 is disposed between the branch oil passage 69 branched from the pilot oil passage 67 interconnecting the outlet port 37 of the second detector S2 and the switching port 64 of the pilot-operated valve 47, and the oil release passage 70 leading to the oil tank 12. The on-off valve 48 is coupled to the piston rod 44 of the actuator 13 via a pivoted link 86, a holder 87, and an actuator rod 88. The pivoted link 86 is operatively coupled at one end to the piston rod 44 and at the other end to the holder 87. The actuator rod 88 is coupled between the on-off valve 48 and the holder 87. When the actuator 13 is operated in a direction (leftward as shown) to open the clutch valve CV, the on-off valve 48 releases the hydraulic throttle pressure Pt from the switching port 64 of the pilot-operated valve 47. The spring 62 acting on the lefthand end of the spool 56 for normally urging the spool 56 to move to the right is housed in the holder 87 and held against an abutment rod 85 integrally joined to the lefthand end of the spool 56 and extending into the holder 87. Movement of the piston rod 44 of the actuator 13 can therefore be fed back to the spring 62 through the link 86 and the holder 87. More specifically, when the actuator 13 is operated in the direction to close the clutch valve CV, the spring 62 stores energy to increase its spring force. Conversely, when the actuator 13 is operated in the direction to open the clutch valve CV, the spring force of the spring 62 is reduced.

According to the second embodiment, the load imposed by the spring 62 is also selected to be relatively large to keep the clutch valve CV fully opened while the engine E is idling, thereby preventing the automobile from creeping.

In each of the above embodiments, the clutch valve CV is fully opened while the engine E is idling. However, the clutch valve CV may be opened to the extent which keeps the automobile from creeping, and such a valve opening setting can be achieved by suitably selecting the load imposed by the spring 62. While the idling of the engine and the starting of the automobile are distinguished from each other by the rotational speed of the engine in the above embodiments, the present invention is not limited to such a detecting process. For example, the intention of the driver to move the automobile, i.e., the depression of the accelerator pedal, may be detected. When the depression of the accelerator pedal is detected, the clutch valve CV may be partly closed to impress an appropriate load on the engine E.

According to another embodiment of the present invention, the automatic control device 14 may be constructed using a microcomputer or the like. More specifically, the operation of the actuator 13 may be controlled by a microcomputer which is programmed to electrically detect the rotational speed of the engine, the throttle valve opening, and the accelerator pedal depression, and to process various signals to produce the same mechanical movements as described above in the aforesaid embodiments. According to this alternative, the actuator 13 may comprise a stepping motor, or the pilot-operated valve 47 may comprise an electrohydraulic servovalve or a solenoid-operated proportional pressure control valve with the actuator in the form of a servo cylinder.

While the hydraulic pump 2 is of the fixed-displacement type and the hydraulic motor 4 is of the variable-displacement type in the illustrated embodiments, the principles of the present invention are applicable to a hydraulically operated automotive transmission in which the hydraulic pump 2 is of the variable-displacement type and the hydraulic motor 4 is of the fixed-displacement type.

The on-off valve 48 may be positioned anywhere insofar as it is interlinked with the clutch valve CV. The detection of the throttle valve opening may be replaced with the detection of any of various other conditions such as the vacuum developed in the intake pipe of the engine, the amount of fuel supplied, and the intention of the driver for acceleration and deceleration, as detected through other members than the accelerator pedal.

Although certain preferred embodiments have been shown and described, it should be understood that many changes and modifications may be made therein without departing from the scope of the appended claims.

I claim:

1. A clutch control system in a hydraulically operated automotive transmission on an automobile having an engine, said transmission including a hydraulic pump coupled to an engine-operated input shaft, a hydraulic motor coupled to a wheel-driving output shaft, a closed hydraulic circuit connected between said hydraulic pump and said hydraulic motor, and a bypass passage connected between the inlet and outlet ports of the hydraulic pump in bypassing relation to said hydraulic motor, said clutch control system comprising:

a clutch valve disposed in said bypass passage for selectively opening and closing said bypass passage;
   an automatic control device coupled to said clutch valve for controlling the operation of the clutch valve; and
   said automatic control device comprising means for opening said clutch valve to a first extent which prevents said automobile from creeping while said engine is idling and for closing said clutch valve to a second extent which prevents said engine from racing by imposing an appropriate load on said engine as said automobile is started.

2. A clutch control system according to claim 1, wherein said means comprises a pilot-operated valve operable under first and second fluid pressures applied respectively to opposite ends thereof, said first fluid pressure being indicative of an idling condition of said engine, and an on-off valve operatively coupled to said clutch valve and controllable by said pilot-operated valve to move selectively into an open position to release said second fluid pressure from said pilot-operated valve for opening said clutch valve to said first extent and into a shut-off position to apply said second fluid pressure to said pilot-operated valve for closing said clutch valve to said second extent.

3. A clutch control system according to claim 2, wherein said on-off valve comprises a cylinder having a first port receptive of said second pressure and a second port communicating with a fluid tank, and a spool slidably fitted in said cylinder and movable between said open position in which said ports communicate with each other and said shut-off position in which said ports are disconnected from each other.

4. A clutch control system according to claim 3, wherein said clutch valve comprises a cylinder having a pair of bypass holes defined in diametrically opposite relation and communicating with said bypass passage, and a bottomed cylindrical valve body slidably disposed in said cylinder of the clutch valve, further including a connecting rod connected between said spool of said on-off valve and said valve body of the clutch valve.

5. A clutch control system according to claim 3, further including an actuator operatively coupled to said on-off valve and controllable by said pilot-operated valve to move between said open and shut-off positions.

6. A clutch control system according to claim 5, wherein said actuator comprises a cylinder, a piston slidably fitted in said cylinder, and a piston rod integrally joined to said piston, further including an actuator rod coupled between said spool of said on-off valve and said piston rod of said actuator.

7. A clutch control system according to claim 6, wherein said pilot-operated valve is a throttling valve comprising a sleeve and a spool movably disposed in said sleeve, said sleeve being connected by a link to said piston rod of said actuator.

8. A clutch control system according to claim 5, wherein said actuator comprises a cylinder, a piston slidably fitted in said cylinder, and a piston rod integrally joined to said piston, further including a pivoted link coupled at one end to said piston rod of said actuator, a holder coupled to the other end of said pivoted link, and an actuator rod coupled between said spool of said on-off valve and said holder.

9. A clutch control system according to claim 8, wherein said pilot-operated valve is a throttling valve comprising a sleeve and a spool movably disposed in said sleeve, said spool being operatively connected by a link to said holder.

10. A clutch control system according to claim 2, further including a first detector operatively coupled to said engine for producing said first fluid pressure and a second detector operatively coupled to said engine for producing said second fluid pressure.

11. A clutch control system according to claim 10, wherein said first detector comprises an engine rotation detector.

12. A clutch control system according to claim 10, wherein said second detector comprises a throttle valve opening detector.

* * * * *